United States Patent

Ogisu et al.

[11] Patent Number: 5,534,297
[45] Date of Patent: Jul. 9, 1996

[54] METHOD FOR SURFACE MODIFICATION OF POLYOLEFIN RESIN MOLDED ARTICLE AND METHOD FOR COATING THE SURFACE OF POLYOLEFIN RESIN MOLDED ARTICLE

[75] Inventors: Yasuhiko Ogisu; Mamoru Kato, both of Nagoya; Shigeyuki Takahashi, Kuwana, all of Japan

[73] Assignee: Toyoda Gosei Co., Ltd., Japan

[21] Appl. No.: 388,696

[22] Filed: Feb. 15, 1995

[30] Foreign Application Priority Data

Feb. 16, 1994 [JP] Japan .................................. 6-019574
Jun. 27, 1994 [JP] Japan .................................. 6-145058

[51] Int. Cl.$^6$ ............................... B05D 3/00; B05D 3/12
[52] U.S. Cl. ................... 427/322; 427/412.3; 525/333.8; 525/388; 528/490
[58] Field of Search .................................... 427/299, 322, 427/304, 305, 306, 393.5, 412.3; 525/388; 528/490

[56] References Cited

U.S. PATENT DOCUMENTS

| 4,803,097 | 2/1989 | Fraenkel et al. | 427/304 X |
| 4,996,076 | 2/1991 | Nakaya et al. | 427/322 X |
| 5,397,602 | 3/1995 | Martz et al. | 427/412.3 X |

Primary Examiner—Michael Lusignan
Attorney, Agent, or Firm—Cushman Darby and Cushman

[57] ABSTRACT

A method for treating the surface of a polyolefin resin molded article is disclosed, comprising applying a running aqueous ozone solution in the form of a stream (or a waterfall) or spray onto the surface of a polyolefin resin molded article to oxidize the surface of the molded article for modifying the surface. Surface modification can be carried out on the same line in a series of processing, and extremely satisfactory results can be obtained by a short-time treatment with reduced energy. A coating layer formed on the modified surface exhibits high adhesion.

11 Claims, 8 Drawing Sheets

DISTANCE FROM THE CENTER OF TEST PIECE P (cm)

METHOD FOR SURFACE MODIFICATION OF POLYOLEFIN RESIN MOLDED ARTICLE AND METHOD FOR COATING THE SURFACE OF POLYOLEFIN RESIN MOLDED ARTICLE

FIELD OF THE INVENTION

This invention relates to a method for surface modification of a molded article of a polyolefin resin having relatively low surface polarity, such as polypropylene, and to a method for coating the surface of a molded article of the polyolefin resin.

BACKGROUND OF THE INVENTION

When a molded article of a polyolefin resin having relatively low surface polarity, typically polypropylene, is processed by, for example, coating, the surface of the molded article is generally cleaned and modified (grained) with a solvent, e.g., trichloroethane, prior to primer coating or plasma treatment. Such pretreatments including modification with a solvent polarize the surface of the molded article to bring about firm adhesion between the surface and a topcoating paint applied thereon. However, with the recent increasing need of limiting use of an organic solvent, especially a halogenated hydrocarbon such as trichloroethane, as a cleaning agent, it has been demanded to develop a new approach for surface modification of a polyolefin resin molded article in place of solvent cleaning.

The technique disclosed in JP-A-3-103448 (the term "JP-A" as used herein means an "unexamined published Japanese patent application") is among such approaches. According to this technique, a polypropylene resin molded article is treated with an ozone stream to oxidize the surface and thereby to render the surface hydrophilic.

The problem associated with this method is that uniform modification of all the surface of a resin molded article cannot be achieved without difficulty. That is, in order to modify the surface uniformly, an ozone stream must be applied to all the surface uniformly while equalizing the time of application on every part of the surface. Therefore, where a resin molded article to be treated has a complicated shape, either the molded article or an ozone stream should be moved properly. Otherwise, all the surface of the molded article cannot be modified uniformly, ultimately resulting in a failure of uniform coating.

In order to eliminate the above-mentioned disadvantage, the inventors of the present invention previously proposed a method for modifying the surface of a polyolefin resin molded article which comprises contacting a polyolefin resin molded article with an aqueous ozone solution to oxidize the surface of said molded article, as disclosed in JP-A-5-163619. By this method, the surface of a polyolefin resin molded article can easily and uniformly be modified without using an organic solvent, thereby making it possible to form a coating layer on the molded article with high adhesive strength.

The above technique has achieved certain excellent results of surface modification on account of the immersion system adopted in which a polyolefin resin molded article is immersed in an aqueous ozone solution at a prescribed temperature. However, it involves a fear of the following disadvantages.

As shown in FIG. 12, molded article 51 is usually cleaned by power wash (washing with running water) using water jet nozzles 52 before it is immersed in an aqueous ozone solution. Since the washing is carried out with resin molded article 51 on belt conveyor 53, molded article 51 should be removed from conveyor 53, transferred into container 54 for immersion, and kept immersed there. Since the power washing is not so effective to clean the side of resin molded article 51 facing to conveyer 53 (i.e., the reverse side of molded article 51), it is very likely that contaminant remaining on the reverse side of resin molded article 51 may be dissolved in the aqueous ozone solution in container 54 while resin molded article 51 is immersed in the aqueous ozone solution. As a result, the aqueous ozone solution tends to be contaminated, sometimes failing to obtain satisfactory results of modification.

Further, in order to maintain the aqueous ozone solution in container 54 at a constant temperature, it is necessary to adjust the temperature of the whole aqueous ozone solution in container 54 by heating with heater 55, which may incur an increased energy cost.

Furthermore, because the aqueous ozone solution is retained in container 54 for a long period of time, there is a tendency that ozone in the aqueous solution decomposes by itself, resulting in a failure of keeping a necessary ozone concentration.

SUMMARY OF THE INVENTION

An object of the present invention is to provide a method for treating (e.g., modifying) the surface of a polyolefin resin molded article having relatively low surface polarity, by which satisfactory results of modification and high adhesion to a topcoating paint can be obtained through a short-time treatment that can be performed in a series of steps while reducing the energy cost involved.

Another object of the present invention is to provide a method for coating the surface of a polyolefin resin molded article with high adhesion.

The present invention relates to a method for treating the surface of a polyolefin resin molded article which comprises applying a stream of running aqueous solution of ozone onto a polyolefin resin molded article to oxidize the surface of the polyolefin resin molded article for modifying the surface.

In a preferred embodiment of the above method, the aqueous ozone solution is running at a velocity of not lower than 0.3 m/sec. If the running velocity is lower than 0.3 m/sec, cases are sometimes met with, in which the surface modification takes much time.

The present invention also relates to a method for treating the surface of a polyolefin resin molded article which comprises spraying a running aqueous solution of ozone onto a polyolefin resin molded article to oxidize the surface of the polyolefin resin molded article for modifying the surface.

In a preferred embodiment of the above method, the spray pressure (A; kPa) of the aqueous ozone solution and the distance (B; cm) between the tip of the nozzle(s) for spraying the aqueous ozone solution and the surface of the polyolefin resin molded article satisfy the relationship:

$$A \cdot B^{-2} \geq 0.07.$$

In another preferred embodiment of the above method, the aqueous ozone solution is maintained at a temperature of from 65° to 85° C.

The present invention additionally relates to a method for treating (e.g., coating) the surface of a polyolefin resin molded article which comprises forming a coating layer on a polyolefin resin molded article with its surface having been modified by either of the above-mentioned surface modification methods either directly or via a primer layer.

DETAILED DESCRIPTION OF THE INVENTION

Figure 1A:
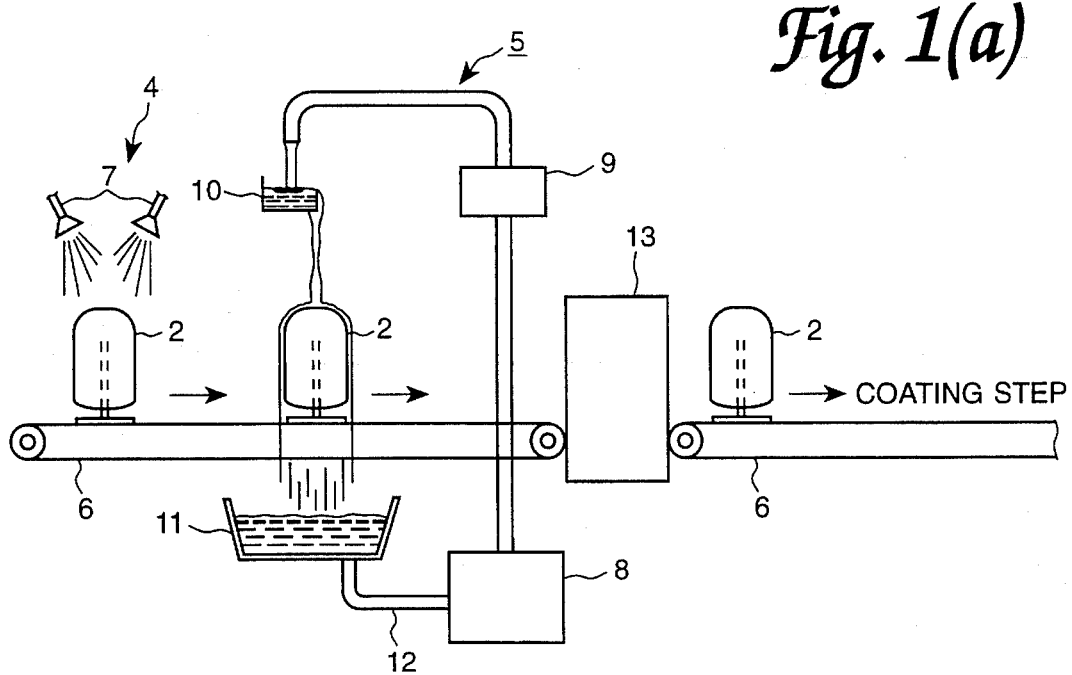
FIGS. 1-a and 1-b are each a system diagram including a surface modifying apparatus which can be used for carrying out the present invention.

According to the first surface treatment (e.g., modification) method of the present invention, a polyolefin resin molded article is brought into contact with a stream of a running aqueous ozone solution. Through the contact, the surface of the molded article is oxidized by the oxidizing power of ozone remaining in water and is thereby polarized. Whatever shape the resin molded article may have, the aqueous ozone solution surely reaches all over the surface of the resin molded article so that an oxidation reaction uniformly takes place on every part of the surface, hardly leaving marks due to reaction unevenness.

Since the aqueous ozone solution in a running state is brought into contact with the surface of the resin molded article, the amount of ozone applied to the surface of the resin molded article per unit time is relatively large.

Unlike the conventional system in which a resin molded article is immersed in an aqueous ozone solution, the contact between a running aqueous ozone solution and the article can be made simply by applying the former to the latter while the latter being on a serial line of processing.

Since heating of the aqueous ozone solution to a permissible maximum temperature is conducted only immediately before the solution is applied to a resin molded article, decomposition of ozone while hot can be minimized. In addition, it is only a portion of the aqueous ozone solution for current use that should be heated, the energy for heating is relatively lower as compared with the above-described conventional immersion system in which the whole aqueous ozone solution must be heated.

When the velocity of the running aqueous ozone solution applied to a resin molded article is 0.3 m/sec or higher, the above-mentioned effect derived from the fact that the amount of ozone applied per unit time is relatively large can be ensured.

According to the second surface treatment (e.g., modification) method of the present invention, spray of a running aqueous ozone solution is brought into contact with the surface of a polyolefin resin molded article. Through the contact, the surface of the molded article is oxidized by the oxidizing power of ozone remaining in water and is thereby polarized. Whatever shape the resin molded article may have, the aqueous ozone solution surely reaches all over the surface of the resin molded article so that an oxidation reaction uniformly takes place on every part of the surface, hardly leaving marks due to reaction unevenness.

Since the aqueous ozone solution is applied to the surface of the resin molded article in the form of spray, the amount of ozone applied to the surface of the resin molded article per unit time is relatively large. Further, as a result of the contact, there is formed on the surface of the resin molded article a diffusing boundary film of an aqueous ozone solution having a relatively small thickness. The diffusing film is further stuck and compressed by the successive spray of an aqueous ozone solution and is thereby discontinuously disturbed. As a result, the time required for ozone molecules to pass through the diffusing phase and reach the surface of the resin molded article can be reduced, and reduction in ozone concentration with time can therefore be minimized, leading to accelerated oxidation reaction.

Unlike the system in which a resin molded article is immersed in an aqueous ozone solution, the contact between a sprayed aqueous ozone solution and the article can be made simply by applying the former to the latter while the latter being on a serial line of processing.

Since heating of the aqueous ozone solution to a permissible maximum temperature is conducted only immediately before the solution is sprayed on to a resin molded article, decomposition of ozone while hot can be minimized. In addition, it is only a portion of the aqueous ozone solution for current use that should be heated, the energy for heating is relatively lower as compared with the above-described conventional immersion system in which the whole aqueous ozone solution must be heated.

When the spray pressure (A; kPa) and the distance (B; cm) of from the tip of the nozzle to the surface of a resin molded article satisfy the relationship: $A \cdot B^{-2} \geq 0.07$, certainty of formation of a thin diffusing boundary film of an aqueous ozone solution on the surface of a molded article can be increased. Further, the above-mentioned effects of compressing the diffusing film and discontinuously disturbing the diffusing film are ensured, making it possible to suppress reductions in ozone concentration and temperature which may occur until the sprayed solution reaches the surface of a resin molded article. As a result, the oxidation reaction is further accelerated. Furthermore, the contact time between the sprayed aqueous ozone solution and air is shortened so that a reduction in ozone concentration due to gas-liquid equilibrium as well as a reduction in temperature may be minimized.

In the second surface modification method, when the aqueous ozone solution is kept at a temperature of from 65° to 85° C. the reactivity of ozone in an aqueous solution can be increased to the full to thereby accelerate the oxidation reaction.

According to the coating method of the present invention, a coating layer is formed directly on the surface of a polyolefin resin molded article with its surface modified by application of a running aqueous ozone solution in the form of a stream or spray. Since the resin molded article with its surface modified has a uniformly oxidized and polarized surface, the coating layer provided thereon exhibits firm adhesion. If desired, a primer layer may be formed on the polyolefin resin molded article having the modified surface. The primer layer similarly exhibits firm adhesion to the modified surface without strictly selecting the primer material or giving any special manipulation in baking. A coating layer can be provided on the thus formed primer layer with good adhesion.

Where a coating layer is formed on the modified surface of a polyolefin resin molded article, it is preferable to use a paint containing chlorinated polypropylene for a coating layer. When a paint containing chlorinated polypropylene is coated as a coating layer on the modified surface of a polyolefin resin molded article, the unchlorinated site of chlorinated polypropylene shows compatibility with unoxidized site on the surface of the resin molded article while the chlorinated site thereof exerts a mutual action on the oxidized functional (polar) group on the surface of the resin molded article. Accordingly, even if the surface modification is insufficient, the coating layer is adhered to the surface of the resin molded article with extremely high adhesion through the synergistic effect of adhesion of chlorinated polypropylene and bonding of polar groups of the paint and those on the surface of the resin molded article.

The present invention will now be illustrated in greater detail by way of Examples. Reference is made to the accompanying drawings.

EXAMPLE 1

Figure 2:
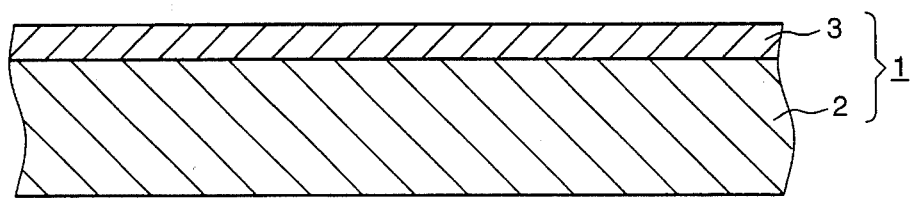
FIG. 2 is a cross section of a type of a resin article prepared in Examples of the present invention.

As shown in FIG. 2, resin article 1, such as a bumper of an automobile, is composed of rein molded article 2 having formed thereon coating layer 3. In this Example, resin molded article 2 was prepared by molding polypropylene in a mold, and the surface thereof was modified (oxidized) as hereinafter described. Coating layer 3 was directly formed on the modified surface.

Figure 1B:
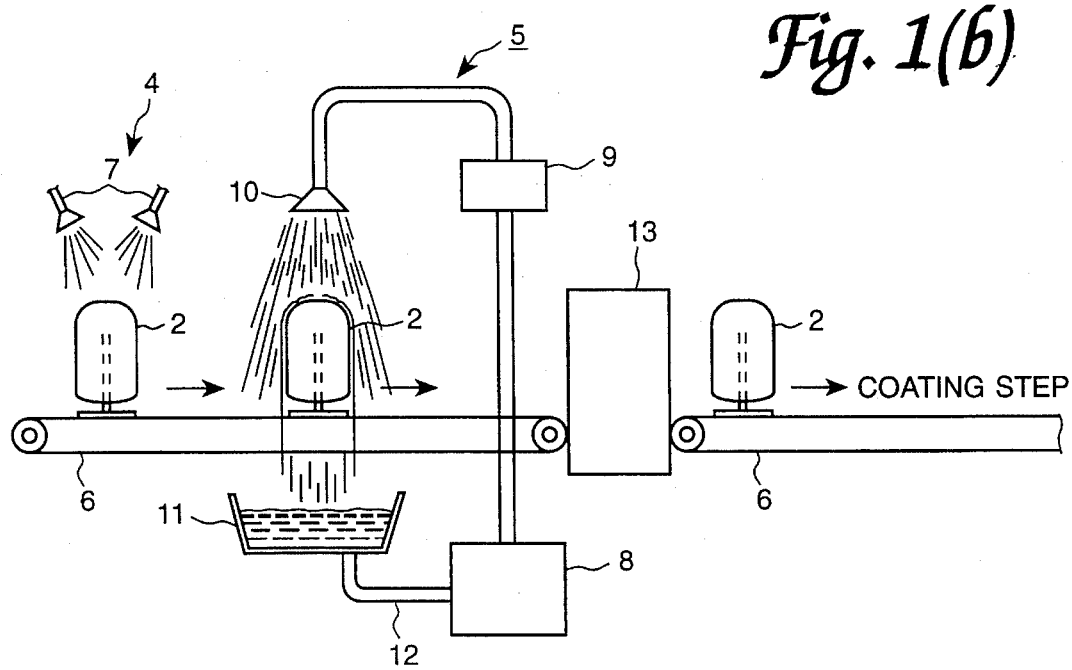

The steps of surface modification of resin molded article 2 involved from after molding up to coating are described along the diagram of FIG. 1-(a).

Surface modification of resin molded article 2 is performed by passing article 2 placed on conveyor 6 through power washer 4 and surface modifying apparatus 5 to, for example, the right in the case of FIG. 1-(a). Power washer 4 is equipped with a pump (not shown) and nozzles 7, from which water jet streams are made to strike against resin molded article 2 to easily remove contaminants on the surface of resin molded article 2.

Surface modifying apparatus 5 is equipped with ozone generator 8, heater 9, trough 10, drain 11, and hoses connecting these members. Ozone generator 8 is designed so as to convert oxygen to ozone and to dissolve ozone in water to prepare an aqueous ozone solution, which is forwarded to heater 9 by a pump (not shown). Heater 9, provided on the way from ozone generator 8 to trough 10, is to heat the flowing aqueous ozone solution to a prescribed temperature. Trough 10 is provided below the end of the hose from heater 9 so that the heated aqueous ozone solution once put therein may overflow like a waterfall and be applied over resin molded article 2. Drain 11, provided below conveyor 6, is to receive the aqueous ozone solution after contact with resin molded article 2. The aqueous ozone solution reserved in drain 11 is introduced to ozone generator 8 via pipe 12 at a constant rate.

Figure 3:
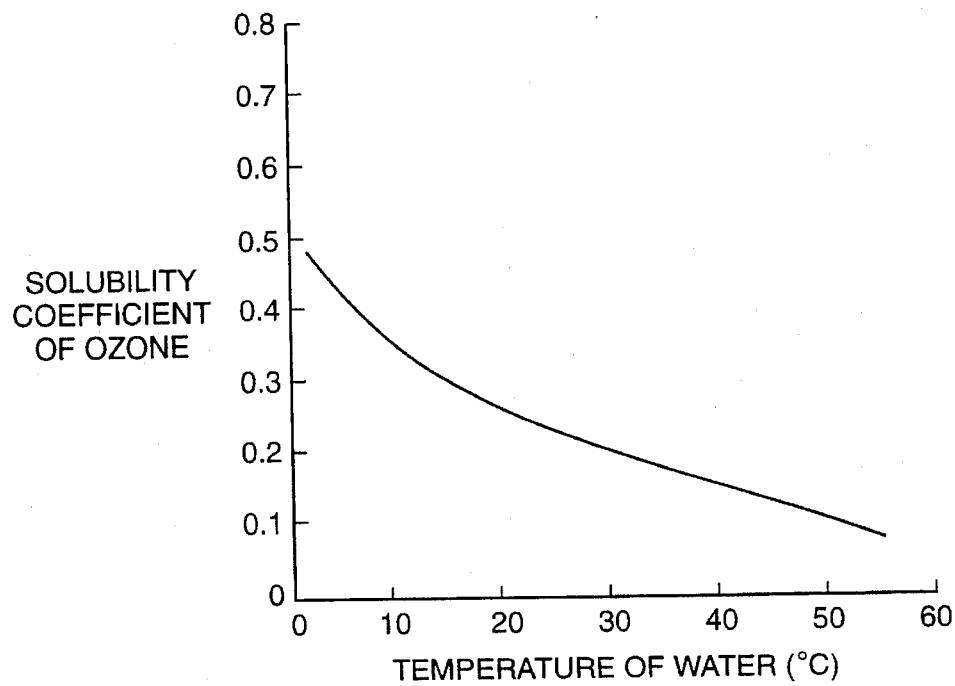
FIG. 3 is a graph of ozone solubility coefficient vs. temperature of water.

In FIG. 3 is shown the relationship between temperature of water and solubility coefficient of ozone. As is seen, the higher the temperature, the lower the solubility of ozone. In addition, ozone becomes readier to be decomposed with an increase in temperature. On the contrary, it is well known that the rate of reaction (rate of surface modification) increases according as the temperature of water rises. Accordingly, it is desirable that the aqueous ozone solution be heated by heater 9 to a properly decided temperature that is moderately low for keeping the ozone concentration as high as possible and, at the same time, moderately high for assuring a satisfactory reaction rate.

Resin molded article 2 with its surface thus modified is dried in drier 13 and then forwarded to a coating step.

The surface modification method using surface modifying apparatus 5 and the effects of the surface modification will be explained below.

Resin molded article 2, molded in a mold to a prescribed shape, is placed on conveyor 6 with its face upward and moved to the direction indicated by the arrow (to the right) of FIG. 1-(a). Water jet streams are spouted from nozzles 7 of power washer 4 and made to strike against the surface of resin molded article 2 thereby clearing contaminants, such as dust, from the surface. In this washing, the back of the resin molded article 2, which is not to be coated, faces conveyor 6 and is not so cleaned.

Resin molded article 2 is further moved to the right and forwarded to surface modifying apparatus 5, where a stream of a running aqueous ozone solution comes into contact with resin molded article 2. Upon the contact, the surface of resin molded article 2 is oxidized by the oxidizing power of ozone remaining in water and is thereby polarized. Whatever shape resin molded article 2 may have (the article of this particular case is shaped into a bumper), the aqueous ozone solution surely reaches all over the surface of resin molded article 2 so that an oxidation reaction uniformly takes place on every part of the surface, hardly leaving marks due to reaction unevenness.

Resin molded article 2 having its surface thus modified is dried in drier 13 and forwarded to a coating step.

Since the aqueous ozone solution in a running state is applied to the surface of resin molded article 2, the amount of ozone applied to the surface of resin molded article 2 per unit time is relatively large. Therefore, the contact time is much shorter than required in the immersion system in which a resin molded article is immersed in an aqueous ozone solution. In other words, a short-time surface treatment will be enough for obtaining satisfactory adhesiveness to a coating layer 3 and, as a result, the productivity is markedly improved.

Unlike the immersion system, the contact between a stream of a running aqueous ozone solution and resin molded article 2 can be made simply by applying the former to the latter while the latter being on a serial line of processing. That is, resin molded article can be subjected to surface modification while on conveyor 6, whereas in the immersion system a resin molded article must be once removed from a conveyor after power washing and then immersed in a container. As a result, equipment for surface modification can be simplified, the space for the equipment can be reduced, and the cost for the equipment can be reduced.

Another difference of this Example and the conventional immersion system resides in that the aqueous ozone solution is heated by heater 9 immediately before it falls in the form of a waterfall on resin molded article 2, whereas in the immersion system the whole aqueous ozone solution in a container must be heated. Therefore, decomposition of ozone which may occur while the aqueous solution is maintained at a high temperature can be minimized and, as a result, the ozone concentration in the running stream of the aqueous ozone solution can be kept high to improve efficiency of surface modification. Besides, it is only a portion of the aqueous ozone solution that has to be heated. Therefore, the energy for heating can be saved, leading to cost reduction.

Experiment A:

In order to verify the above-described actions and effects, a test piece was experimentally treated using various means for applying an aqueous ozone solution, and the results of surface modification were examined.

Preparation of Test Piece P:

A propylene homopolymer was molded into a test piece of 100 mm wide, 150 mm long, and 3 mm thick (hereinafter designated test piece P).

Test piece P was washed by striking a jet of water of 60° C. against the surface of test piece P at a water pressure of 100 kPa to remove dust.

Figure 4:
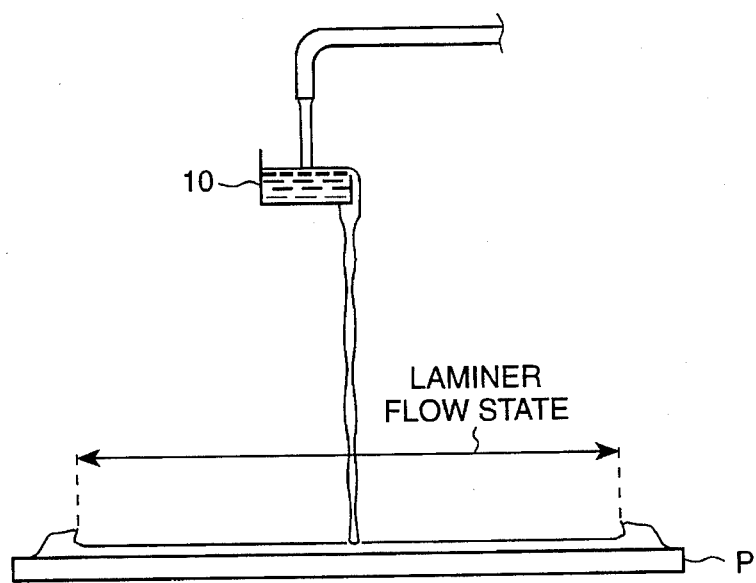
FIGS. 4, 5 and 6 are each an enlarged view of a means for applying an aqueous ozone solution used in a surface modifying apparatus and test piece P.
Figure 5:
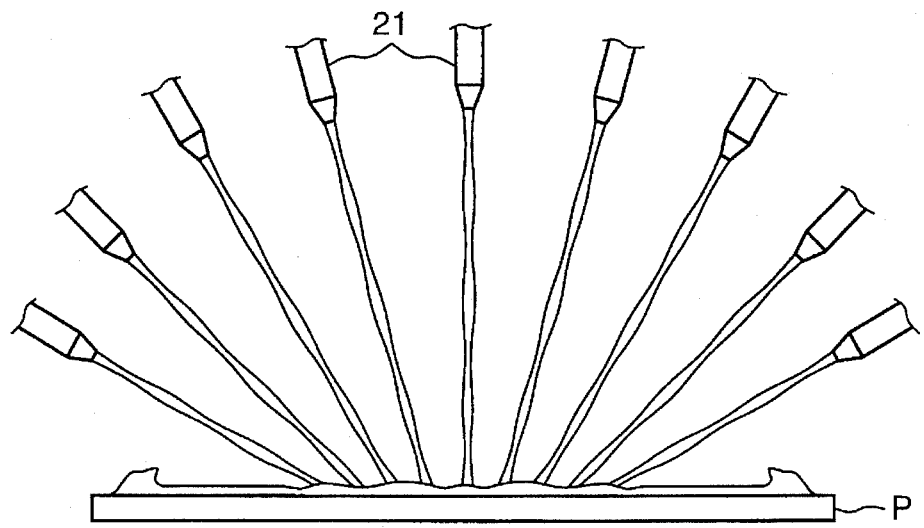
Figure 6:
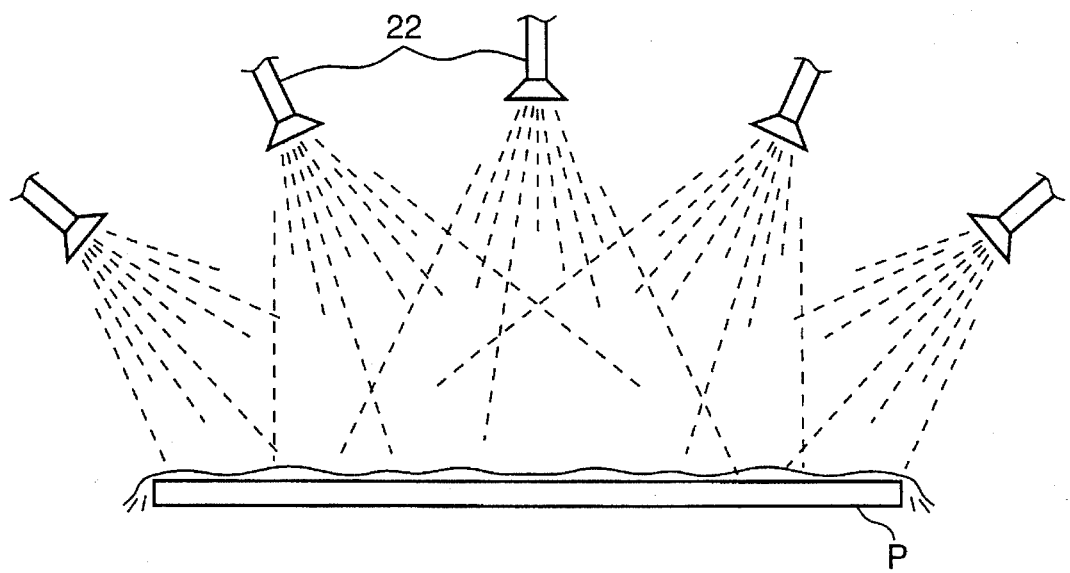

Laboratory Device:

Three different means for applying an aqueous ozone solution to test piece P (hereinafter referred to as application means) were prepared. The first one is the same as used in surface modifying apparatus 5 shown in FIG. 1-(a), i.e., a means for letting an aqueous ozone solution overflow trough 10 in the form of a waterfall and fall on test piece P as shown in FIG. 4. The second one is a means for applying a plurality of water streams spouted from the respective nozzle 21 on to test piece P as shown in FIG. 5. The third one is a means for showering (or spraying) an aqueous ozone solution from a plurality of nozzles as shown in FIG. 6.

Figure 7A:
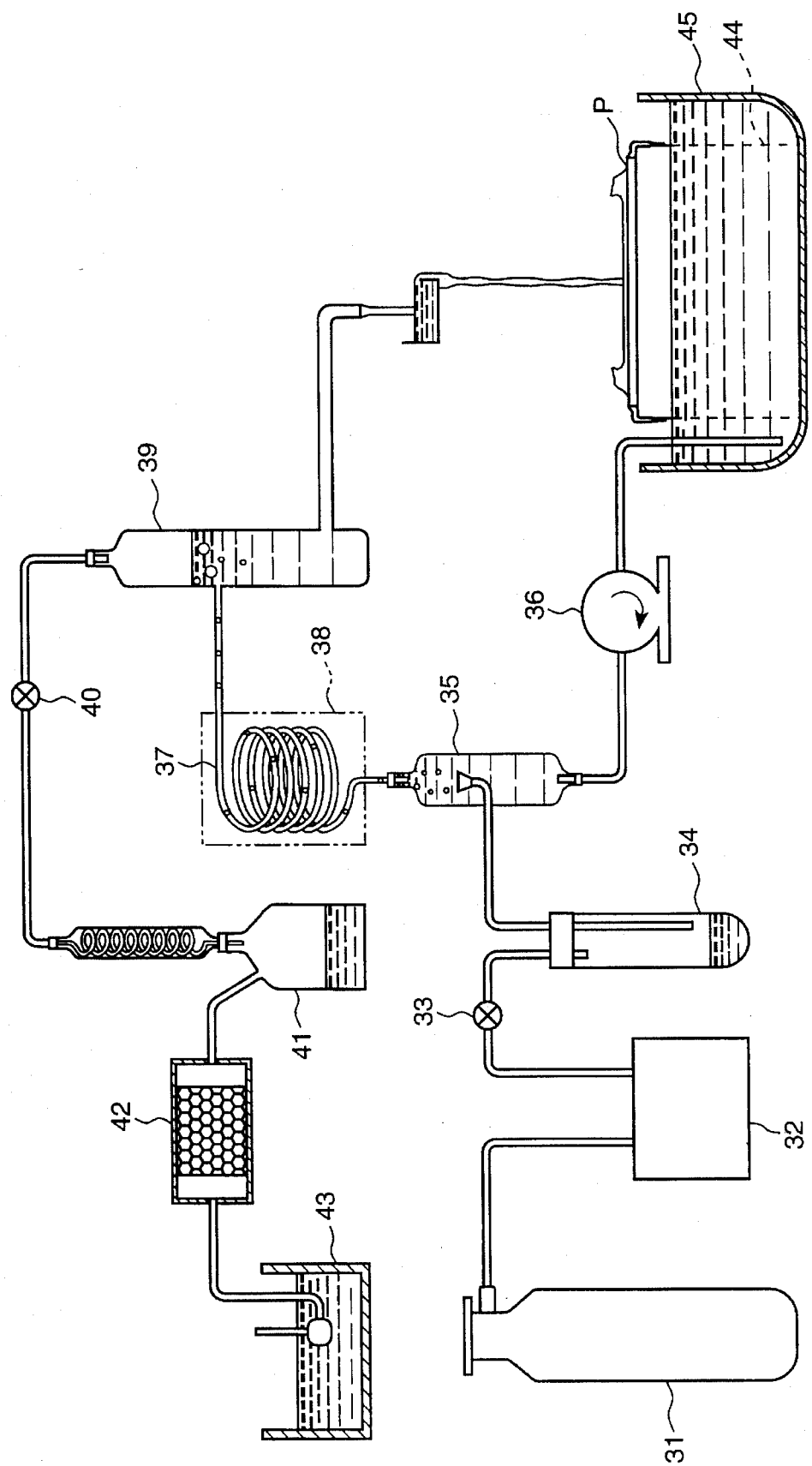
FIGS. 7-a and 7-b are each a schematic illustration of the laboratory device for carrying out experiment with surface modification.
Figure 7B:
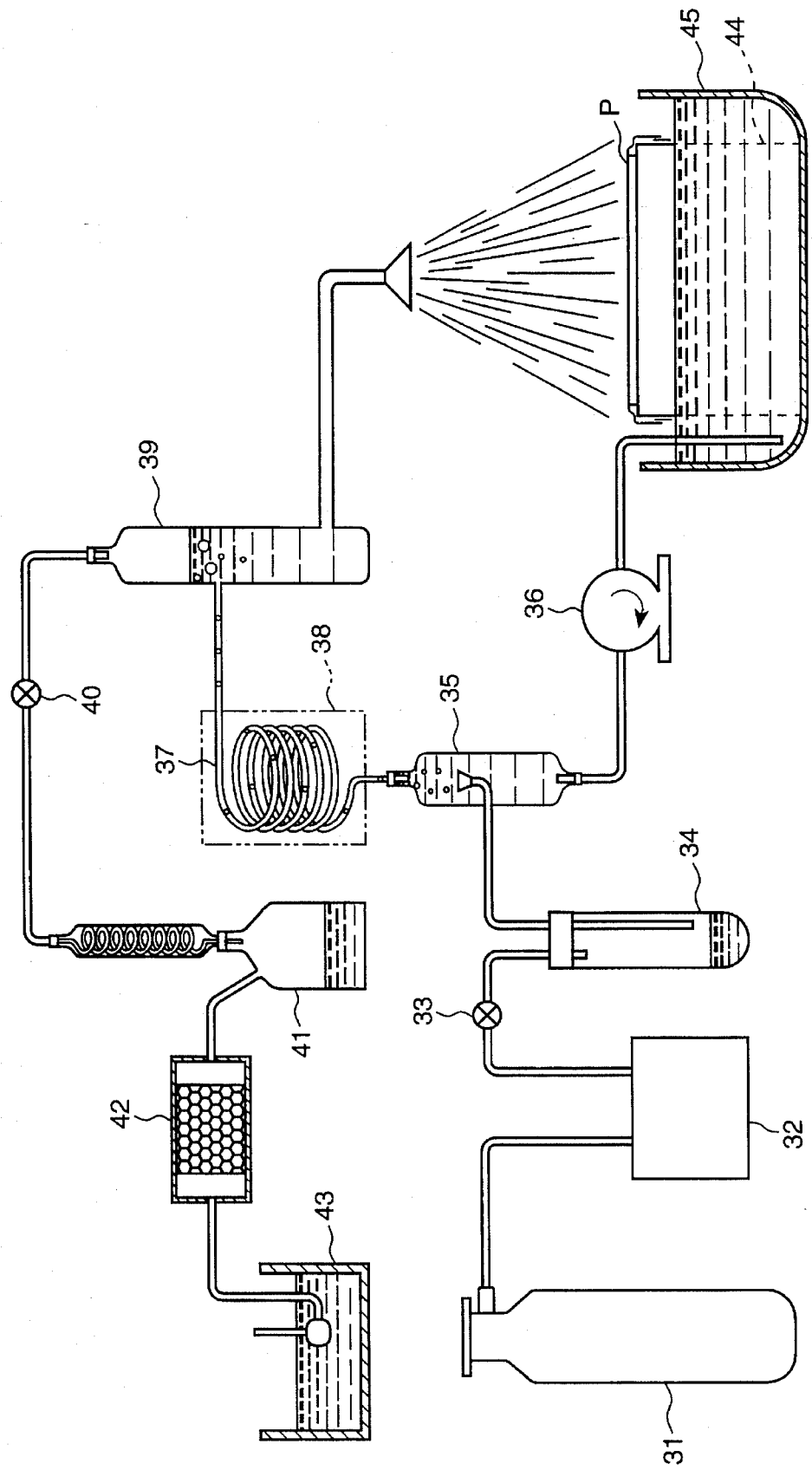

Members of the laboratory device other than the application means are shown in FIG. 7-(a). As shown in the FIG. 7-(a), oxygen cylinder 31 is connected to ozone generator 32, and generated ozone is fed to mixer 35 via valve 33 and back-flow trap 34. To mixer 35 is also fed an aqueous ozone solution (nearly water) by means of pump 36, where ozone gas is dissolved in water to form an aqueous ozone solution. The aqueous ozone solution is introduced into another mixer 37 together with part of the ozone gas, where dissolving is continued while heating the aqueous ozone solution to a prescribed temperature by heater 38 provided around mixer 37.

The aqueous ozone solution is then introduced into gas trap 39 where excess ozone gas is trapped and forwarded, through valve 40 and condensed moisture trap 41, to activated carbon filter 42, where ozone gas is decomposed to oxygen gas, which is discharged to the open air through aspirator 43. On the other hand, the aqueous ozone solution from gas trap 39 is led to one of the above-mentioned three application means (the particular application means adopted in FIG. 7-(a) is trough 10, the one first mentioned) and applied to test piece P on rack 44. The aqueous ozone solution having spread over test piece P is reserved in glass container 45 and led to pump 36 as mentioned above. In the experiment, the above-described flow of steps is repeated.

Experimental Procedure:

In the above device, the ozone concentration, hydrogen ion concentration (pH), temperature, and flow rate of the aqueous ozone solution immediately before entering the application means were 6 to 7 ppm, pH of about 4, 50° C., and 1.7 l/min, respectively. A silent discharge type ozone generator OZSD-5A (manufactured by Ebara Jitsugyo K.K.) was used as ozone generator 32. The rate of ozone generation was 3 g/hr. The concentration of the aqueous ozone solution was measured with a commercially available measuring instrument Kentaro (manufactured by Ebara Jitsugyo K.K.).

Figure 12:
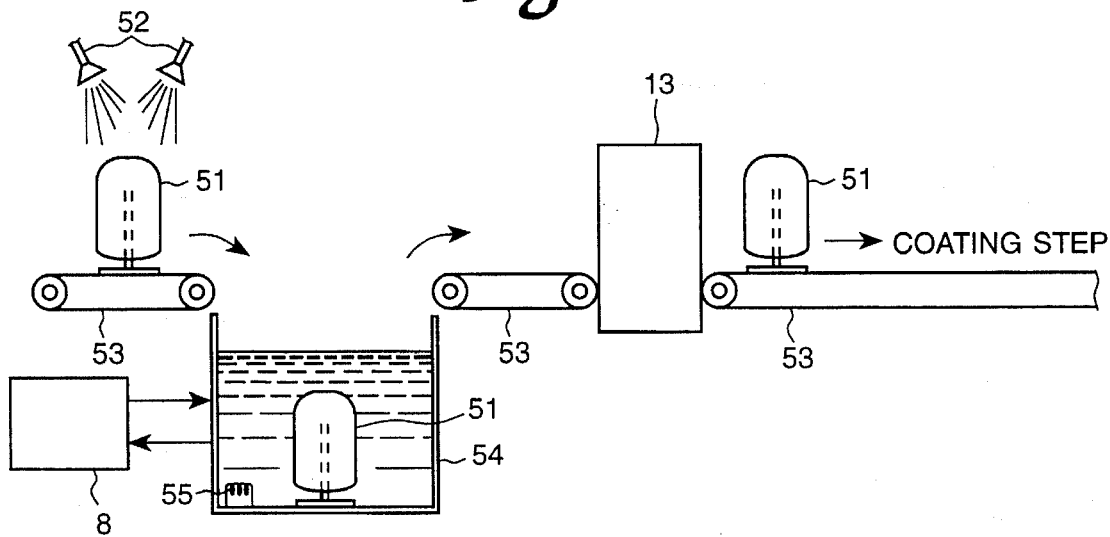
FIG. 12 is a conventional system diagram including a surface modification apparatus.

For comparison, test piece P was treated according to the conventional immersion system (see FIG. 12). The conditions of the surface treatment, e.g., the ozone concentration, pH and temperature of an aqueous ozone solution, were the same as in Example 1.

Test piece P was subjected to surface modification using each of the above-illustrated devices while varying the time of treatment. After drying, the thus obtained surface-treated test piece was coated with a urethane paint SFX200 (produced by Kansai Paint Co., Ltd.) and dried. The peeling strength of the coating layer formed was measured with a tensile tester Tensilon at a peel angle of 180° and a pulling speed of 50 mm/sec.

Results:

The ozone concentration of the aqueous ozone solution and the time required for the peeling strength at the central portion in the width direction to reach 1 kN/m were determined. The results obtained are shown in Table 1 below.

TABLE 1

|  | First Means | Second Means | Third Means | Comparative Example |
| --- | --- | --- | --- | --- |
| Ozone Concentration (ppm) | 6 | 6 | 6 | 4 |
| Necessary Treating Time (min) | 5 | 5 | 10 | 20 |

As is apparent from the results in Table 1, the ozone concentration in the aqueous solution can be increased by using the 1st to 3rd application means according to the present invention to 1.5 times that of Comparative Example, assumably for the following reasons. In Comparative Example, since the whole aqueous ozone solution in the container must be heated, it is considered that ozone in the aqueous solution is decomposed while in a heated state, resulting in an ozone concentration as low as 4 ppm. In Example 1, to the contrary, aqueous ozone solution only has to be heated immediately before being applied to test piece P. Even when it is heated up to 50° C., it reaches test piece P virtually before being decomposed. As a result, the ozone concentration in the aqueous solution immediately before contact with test piece P is as high as 6 ppm.

With respect to the necessary treating time (the time required for achieving a peeling strength of 1 kN/m, an essential and sufficient strength, in the central part of test piece P), the necessary treating time in Example 1 is a half or smaller (from ¼ to ½) of that in Comparative Example, indicating a remarkable reduction in treating time. This seems to be partly because of the above-stated high ozone concentration and partly because the aqueous ozone solution in contact with test piece P is in a running state so that the amount of ozone applied to test piece P per unit area is relatively large.

Figure 8:
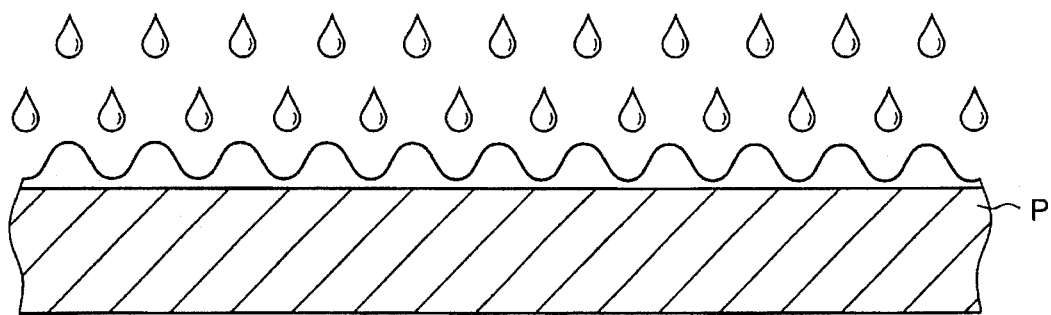
FIG. 8 schematically illustrates the state of an aqueous ozone solution fed by the means shown in FIG. 6 on and in the vicinity of the surface of test piece P.

It can also be seen that the treating time necessary to obtain a prescribed peeling strength in using the 1st or 2nd application means is shorter than that in using the 3rd application means (showering). This seems to be because the aqueous ozone solution applied by the 1st or 2nd application means spreads on the surface of test piece P in a so-called laminar flow (state) to exert a kind of stirring action (see FIG. 9 hereinafter described). On the other hand, the aqueous ozone solution applied by the 3rd application means comes into contact with the surface of test piece P in the form of dispersing water droplets as shown in FIG. 8. As a result, the area showing the above-mentioned laminar flow seems to be narrower than in the former case. From all these considerations, it would be most efficient to contact the aqueous ozone solution in a running state with test piece P and, after the contact, to make the solution diffuse in a so-called laminar flow (state).

Experiment B:

The influence of velocity of a running aqueous ozone solution on surface modification was examined under the following conditions using the same test piece P (after power wash) as used in Experiment A.

Figure 9:
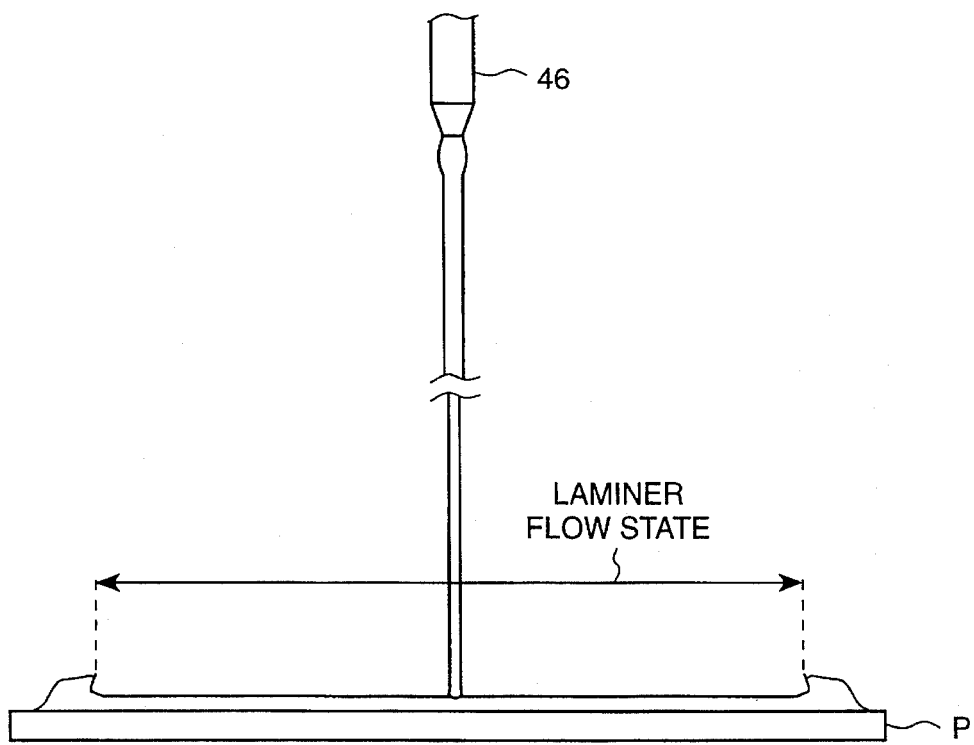
FIG. 9 is an enlarged view of a means for applying an aqueous ozone solution used in a surface modifying apparatus and test piece P.

The laboratory device used is the same as used in Experiment A, except for using single nozzle 46 as shown in FIG. 9 as an application means. Nozzle 46 has an orifice diameter of 5 mm and is fitted 300 mm high from the center of test piece P. The temperature, ozone concentration and flow rate of the aqueous ozone solution were 50° C., 6 ppm, and 1.7 l/min, respectively.

Results:

As shown in FIG. 9, the aqueous ozone solution applied onto test piece P diffused concentrically from the center of test piece P in a so-called laminar flow within a prescribed distance from the center, with the periphery outside the laminar flow area forming a protuberance. The velocities in the central portion of test piece P and the peripheral portion of the laminar flow area were 4.5 m/sec and 0.3 m/sec, respectively. The velocity at the edges of test piece P was 0.04 m/sec.

Figure 10:
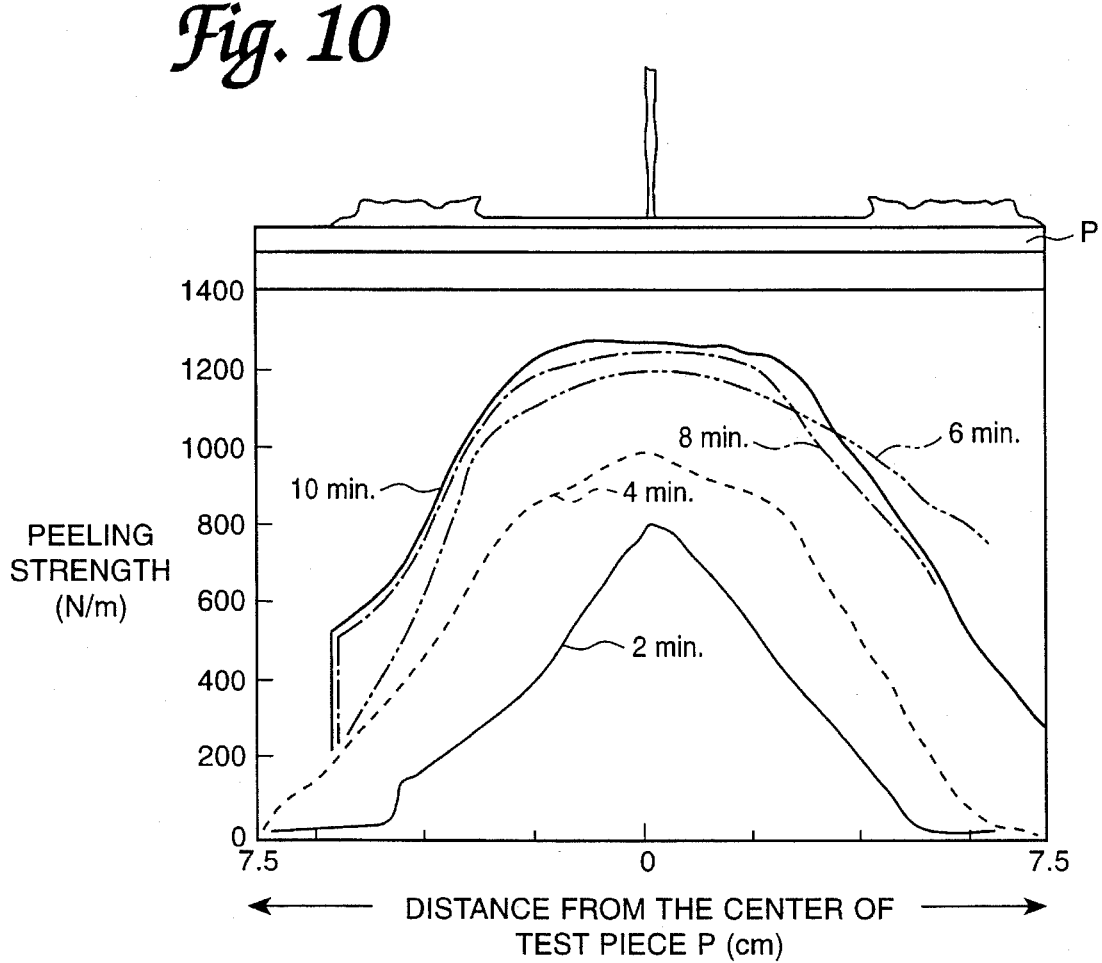
FIG. 10 is a graph showing the distribution of peeling strength in the width direction of test piece P having been surface modified for a varied time.

In FIG. 10 is shown a graph of peeling strength distribution in the width direction of test piece P with the treating time varied. It is seen from the graph that the peeling strength is increasing toward the central portion of test piece P; that the peeling strength is increasing with treating time to a certain extent; and that the peeling strength in the area where the aqueous ozone solution had a laminar flow is significantly higher than in the non-laminar flow area, revealing satisfactory achievement of surface modification. It seems that the surface modification had been achieved more rapidly in the laminar flow area than in the non-laminar flow area.

As a conclusion, it is preferable for rapid achievement of surface modification that the velocity of the running aqueous ozone solution is not lower than 0.3 m/sec.

The present invention is not construed as being limited to Example 1 and may be carried out according to the following embodiments.

Figure 11:
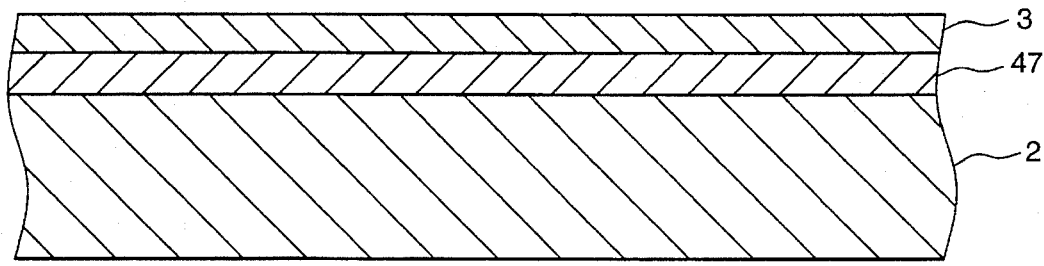
FIG. 11 is a cross section of another type of a resin article according to the present invention.

(1) While in Example 1 resin article 1 is composed of resin molded article 2 having directly formed thereon coating layer 3, primer layer 47 may be interposed between resin molded article 2 and coating layer 3 as shown in FIG. 11. In this embodiment, primer layer 47 can be adhered with firm adhesion to the surface of resin molded article 2, the surface having been uniformly oxidized and polarized, without strictly selecting the primer material or giving any special manipulation in baking. Coating layer 3 can then be provided on the thus formed primer layer with good adhesion.

(2) While in Example 1 resin molded article 2 is washed using power washer 4 before surface modification, such a washing step may be omitted.

(3) While in Example 1 a polypropylene resin molded article is used as a substrate of surface modification, the present invention may be applied to a molded article of any other polyolefin resins, such as polyethylene. Further, the shape of the molded article is not limited to a bumper shape as in Example 1, and the present invention may be applied to a resin molded article of any other shapes, such as to various exterior trim parts, e.g., a grille, a garnish, a molding, a spoiler, a lamp, a mark, an emblem, a wheel cover, etc.

(4) While in Example 1 heater 9 or 38 is provided on the line at a position immediately before the stage of applying an aqueous ozone solution onto resin molded article 2, it may be fitted in a more upstream position. For example, the heater may be set in glass container 45 in some cases.

(5) In Example 1 the aqueous ozone solution is applied to the face of resin molded article 2 (the side to be coated). If all the surfaces of resin molded article 2 are to be modified, the application means may be designed so as to apply the aqueous ozone solution from every necessary direction.

The following embodiment is, while not being claimed, led from Example 1 and is included under the scope of the present invention.

(a) A surface modification method as claimed in claim 1, characterized in that the aqueous ozone solution is heated immediately before being brought into contact with the resin molded article. In this embodiment, the ozone concentration in the aqueous solution can further be increased, and the efficiency of surface modification can further be improved.

EXAMPLE 2

Resin article 1 shown in FIG. 2 was produced. The steps of surface modification of resin molded article 2 involved from after molding up to coating are described along the diagram of FIG. 1-(b).

Surface modification of resin molded article 2 is performed by passing article 2 placed on conveyor 6 through power washer 4 and surface modifying apparatus 5 to, for example, the right in the case of FIG. 1-(b). Power washer 4 is equipped with a pump (not shown) and nozzles 7, from which water jet streams are made to strike against resin molded article 2 to easily remove contaminants on the surface of resin molded article 2.

Surface modifying apparatus 5 is equipped with ozone generator 8, heater 9, spray nozzle 10, drain 11, and hoses connecting these members. Ozone generator 8 is designed so as to convert oxygen to ozone and to dissolve ozone in water to prepare an aqueous ozone solution, which is forwarded to heater 9 by a pump (not shown). Heater 9, provided on the way from ozone generator 8 to spray nozzle 10, is to heat the flowing aqueous ozone solution to a prescribed temperature.

Spray nozzle 10 is provided at the end of the hose from heater 9 so that the heated aqueous ozone solution may be sprayed over resin molded article 2. Taking the spray pressure as A (kPa) and the distance between the tip of nozzle 10 and resin molded article 2 as B, it is preferable that A and B satisfy the relationship $A \cdot B^{-2} \geq 0.07$.

Drain 11, provided below conveyor 6, is to receive the aqueous ozone solution after contact with resin molded article 2. The aqueous ozone solution reserved in drain 11 is introduced to ozone generator 8 via pipe 12 at a constant rate.

In FIG. 3 is shown the relationship between temperature of water and solubility coefficient of ozone. As is seen, the higher the temperature, the lower the solubility of ozone. In addition, ozone becomes readier to be decomposed with an increase in temperature. On the contrary, it is well known that the rate of reaction (rate of surface modification) increases according as the temperature of water rises. Accordingly, it is desirable that the aqueous ozone solution be heated by heater 9 to a properly decided temperature that is moderately low for keeping the ozone concentration as high as possible and, at the same time, moderately high for assuring a satisfactory reaction rate. Such a temperature preferably ranges from 65° to 85° C.

Resin molded article 2 with its surface thus modified is dried in drier 13 and then forwarded to a coating step.

The surface modification method using surface modifying apparatus 5 and the effects of the surface modification will be explained below.

Resin molded article 2, molded in a mold to a prescribed shape, is placed on conveyor 6 with its face upward and moved to the direction indicated by the arrow (to the right) of FIG. 1-(b). Water jet streams are spouted from nozzles 7 of power washer 4 and made to strike against the surface of resin molded article 2 thereby clearing contaminants, such as dust, from the surface. In this washing, the back of the resin molded article 2, which is not to be coated, faces conveyor 6 and is not so cleaned.

Resin molded article is further moved to the right and forwarded to surface modifying apparatus 5, where spray of an aqueous ozone solution comes into contact with resin molded article 2. Upon the contact, the surface of resin molded article 2 is oxidized by the oxidizing power of ozone remaining in water and is thereby polarized. Whatever shape resin molded article 2 may have (the article of this particular case is shaped into a bumper), the sprayed aqueous ozone solution surely reaches all over the surface of resin molded article 2 so that an oxidation reaction uniformly takes place on every part of the surface, hardly leaving marks due to reaction unevenness.

Resin molded article 2 having its surface thus modified is dried in drier 13 and forwarded to a coating step.

Since the aqueous ozone solution is sprayed onto the surface of resin molded article 2, the amount of ozone applied to the surface of resin molded article 2 per unit time is relatively large. Therefore, the contact time is much shorter than required in the immersion system in which a resin molded article is immersed in an aqueous ozone solution. In other words, a short-time surface treatment will be enough for obtaining satisfactory adhesiveness to coating layer 3 and, as a result, the productivity is markedly improved.

Since the aqueous ozone solution is applied on the surface of resin molded article 2 by spraying, a diffusing boundary film of an aqueous ozone solution having a relatively small thickness is formed on the surface of resin molded article 2. The diffusing film is further stuck and compressed by the successive spray of an aqueous ozone solution and is thereby discontinuously disturbed. As a result, the time required for ozone molecules to pass through the diffusing phase and reach the surface of the resin molded article can be reduced, and reduction in ozone concentration with time can therefore be minimized, leading to accelerated oxidation reaction.

Unlike the immersion system, the contact between a sprayed aqueous ozone solution and resin molded article 2 can be made simply by spraying the former onto the latter while the latter being on a serial line of processing. That is, the resin molded article can be subjected to surface modification while on conveyor 6, while in the immersion system a resin molded article must be once removed from a conveyor after power washing and then immersed in a container. As a result, equipment for surface modification can be simplified, the space for the equipment can be reduced, and the cost for the equipment can be reduced.

Another difference of Example 2 and the conventional immersion system resides in that the aqueous ozone solution is heated by heater 9 immediately before it is sprayed onto resin molded article 2, whereas in the immersion system the whole aqueous ozone solution in a container must be heated. Therefore, decomposition of ozone which may occur while the aqueous solution is maintained at a high temperature can be minimized and, as a result, the ozone concentration in the spray of the aqueous ozone solution can be kept high to improve efficiency of surface modification. Besides, it is only a portion of the aqueous ozone solution that has to be heated. Therefore, the energy for heating can be saved, leading to cost reduction.

Experiment A:

In order to verify the above-described actions and effects, a test piece was experimentally treated under various conditions, and the results of surface modification were examined.

Preparation of Test Piece P:

A propylene homopolymer was molded into a test piece of 100 mm wide, 150 mm long, and 3 mm thick (hereinafter designated test piece P).

Test piece P was washed by striking a jet of water of 60° C. against the surface of test piece P at a water pressure of 100 kPa to remove dust.

Laboratory Device:

The surface modifying apparatus as shown in FIG. 1-(b) was used. That is, the application means used is of the type in which an aqueous ozone solution is sprayed through spray nozzle 10 onto test piece P.

Members of the laboratory device other than the application means are shown in FIG. 7-(b). As shown in the FIG. 7-(b), oxygen cylinder 31 is connected to ozone generator 32, and generated ozone is fed to mixer 35 via valve 33 and backflow trap 34. To mixer 35 is also fed an aqueous ozone solution (nearly water) by means of pump 36, where ozone gas is dissolved in water to form an aqueous ozone solution. The aqueous ozone solution is introduced into another mixer 37 together with part of the ozone gas, where dissolving is continued while heating the aqueous ozone solution to a prescribed temperature by heater 38 provided around mixer 37.

The aqueous ozone solution from mixer 37 is then introduced into gas trap 39 where excess ozone gas is trapped and forwarded, through valve 40 and condensed moisture trap 41, to activated carbon filter 42, where ozone gas is decomposed to oxygen gas, which is discharged to the open air through aspirator 43. On the other hand, the aqueous ozone solution from gas trap 39 is led to one of the above-mentioned application means and applied to test piece P on rack 44. The aqueous ozone solution having spread over test piece P is reserved in glass container 45 and led to pump 36 as mentioned above. In the experiment, the above-described flow of steps is repeated.

Experimental Procedure:

In the above device, the ozone concentration, hydrogen ion concentration (pH), temperature, and flow rate of the aqueous ozone solution immediately before entering the application means were 5 to 6 ppm, pH of about 5.5, 70° C., and 4.5 l/min (Sample Nos. 2 to 4) or 6.0 l/min (Sample No. 5 to 8), respectively. The treating time per sample was 100 seconds. A silent discharge type ozone generator OZSD-5A (manufactured by Ebara Jitsugyo K. K.) was used as ozone generator 32. The rate of ozone generation was 3 g/hr. The concentration of the aqueous ozone solution was measured with a commercially available measuring instrument Kentaro (manufactured by Ebara Jitsugyo K.K.).

For comparison, test piece P (Sample No. 1) was treated according to the conventional immersion system (see FIG. 12) using the same aqueous ozone solution as used above.

Surface modification of test piece P was carried out using the laboratory equipment described above while varying the spray pressure A by exchanging spray nozzles 10 and varying the distance B between the tip of spray nozzle 10 and test piece P as shown in Table 2. After drying, the thus obtained surface-treated test piece was coated with a urethane paint SFX200 (produced by Kansai Paint Co., Ltd.) and dried at 80° C. The peeling strength of the coating layer formed was measured with a tensile tester Tensilon at a peel angle of 180° and a pulling speed of 50 mm/sec.

Results:

The peeling strength of the coating layer at the central portion in the width direction was measured. The results obtained are shown in Table 2.

TABLE 2

| Sample No. | Spray Pressure A (kPa) | Distance B (cm) | $A \cdot B^{-2}$ | Peeling Strength (N/m) |
|---|---|---|---|---|
| 1 | 0 (immersion) | — | — | ≦40 |
| 2 | 40 | 35 | 0.033 | 50 |
| 3 | 100 | 35 | 0.082 | 800 |
| 4 | 150 | 35 | 0.122 | 1000 |
| 5 | 40 | 15 | 0.178 | 1100 |
| 6 | 40 | 20 | 0.100 | 700 |
| 7 | 40 | 30 | 0.044 | 150 |
| 8 | 40 | 40 | 0.025 | 100 |

As is apparent from the results in Table 2, the samples treated with the spray of an aqueous ozone solution exhibit extremely excellent adhesion to a coating layer as compared with the comparative sample treated by immersion in an aqueous ozone solution. It is seen that the adhesion to a coating layer can considerably be increased by setting a high $A \cdot B^{-2}$ value, i.e., by making the spray pressure A as high as possible and the distance B as short as possible, particularly by setting the $A \cdot B^{-2}$ value at 0.07 or higher.

Experiment B:

The influence of the temperature of an aqueous ozone solution on adhesive strength of a coating layer was examined by conducting surface modification in the same manner as in Experiment A except for varying the temperature of the aqueous ozone solution. The adhesion of the coating layer was evaluated according to the measurement of peeling strength. The results obtained are shown in Table 3.

TABLE 3

| Temperature (°C.) | 50 | 70 | 80 | 90 |
|---|---|---|---|---|
| Adhesion | slightly strong | strong | very strong | weak |

It can be seen that the adhesive strength to a coating layer also depends on the temperature of the sprayed aqueous ozone solution. That is, if the temperature is higher than 85° C., not only is ozone hardly dissolved in water but a considerable amount of ozone is decomposed by the time when generated ozone reaches test piece P. As a result, the effects of the surface modification are not so high as expected. If the temperature is lower than 65° C., a high ozone concentration can be obtained, but the reactivity of the aqueous solution itself is not so high as to give favorable results as expected.

The present invention is not construed as being limited to Example 2 and may be carried out according to the following embodiments.

(1) While in Example 2 resin article 1 is composed of resin molded article 2 having directly formed thereon coating layer 3, primer layer 47 may be interposed between resin molded article 2 and coating layer 3 as shown in FIG. 11. In this embodiment, primer layer 47 can be adhered with firm adhesion to the surface of resin molded article 2, the surface having been uniformly oxidized and polarized, without strictly selecting the primer material or giving any special manipulation in baking. Coating layer 3 can then be provided on the thus formed primer layer with good adhesion.

(2) While in Example 2 resin molded article 2 is washed using power washer 4 before surface modification, such a washing step may be omitted.

(3) While in Example 2 a polypropylene resin molded article is used as a substrate of surface modification, the present invention may be applied to a molded article of any other polyolefin resins, such as polyethylene. Further, the shape of the molded article is not limited to a bumper shape as in Example 2, and the present invention may be applied to a resin molded article of any other shapes, such as various exterior trim parts, e.g., a grille, a garnish, a molding, a spoiler, a lamp, a mark, an emblem, a wheel cover, etc.

(4) While in Example 2 heater 9 or 38 is provided on the line at a position immediately before the stage of applying an aqueous ozone solution onto resin molded article 2, it may be fitted in a more upstream position. For example, the heater may be set in glass container 45 in some cases.

(5) In Example 2 the spray of the aqueous ozone solution is applied to the face of resin molded article 2 (the side to be coated). If all the surfaces of resin molded article 2 are to be modified, the aqueous ozone solution may be sprayed from every necessary direction.

The following embodiment is, while not being claimed, led from Example 4 and is included under the scope of the present invention.

(a) A surface modification method as claimed in claim 6, characterized in that the aqueous ozone solution is heated immediately before being brought into contact with the rein molded article. In this embodiment, the ozone concentration in the aqueous solution can further be increased, and the efficiency of surface modification can further be improved.

EXAMPLE 3

In this Example, resin article 1 as shown in FIG. 2 was prepared by molding polypropylene in a mold to obtain resin molded article 2, subjecting the surface of resin molded article 2 to surface modification (oxidation) as hereinafter described, and forming coating layer 3 directly on the modified surface. The paint forming coating layer 3 comprises a polyester-based paint having incorporated thereinto chlorinated polypropylene.

The steps of surface modification of resin molded article 2 involved from after molding up to coating are described along the diagram of FIG. 1-(b).

Surface modification of resin molded article 2 is performed by passing article 2 placed on conveyor 6 through power washer 4 and surface modifying apparatus 5 to, for example, the right in the case of FIG. 1-(*b*). Power washer 4 is equipped with a pump (not shown) and nozzles 7, from which water jet streams are made to strike against resin molded article 2 to easily remove contaminants on the surface of resin molded article 2.

Surface modifying apparatus 5 is equipped with ozone generator 8, heater 9, spray nozzle 10, drain 11, and hoses connecting these members. Ozone generator 8 is designed so as to convert oxygen to ozone and to dissolve ozone in water to prepare an aqueous ozone solution, which is forwarded to heater 9 by a pump (not shown). Heater 9, provided on the way from ozone generator 8 to spray nozzle 10, is to heat the flowing aqueous ozone solution to a prescribed temperature.

Spray nozzle 10 is provided at the end of the hose from heater 9 so that the heated aqueous ozone solution may be sprayed over resin molded article 2.

Drain 11, provided below conveyor 6, is to receive the aqueous ozone solution after contact with resin molded article 2. The aqueous ozone solution reserved in drain 11 is introduced to ozone generator 8 via pipe 12 at a constant rate.

In FIG. 3 is shown the relationship between temperature of water and solubility coefficient of ozone. As is seen, the higher the temperature, the lower the solubility of ozone. In addition, ozone becomes readier to be decomposed with an increase in temperature. On the contrary, it is well known that the rate of reaction (rate of surface modification) increases according as the temperature of water rises. Accordingly, it is desirable that the aqueous ozone solution be heated by heater 9 to a properly decided temperature that is moderately low for keeping the ozone concentration as high as possible and, at the same time, moderately high for assuring a satisfactory reaction rate.

Resin molded article 2 with its surface thus modified is dried in drier 13 and then forwarded to a coating step.

The surface modification method using surface modifying apparatus 5 and the effects of the surface modification will be explained below.

Resin molded article 2, molded in a mold to a prescribed shape, is placed on conveyor 6 with its face upward and moved to the direction indicated by the arrow (to the right) of FIG. 1-(*b*). Water jet streams are spouted from nozzles 7 of power washer 4 and made to strike against the surface of resin molded article 2 thereby clearing contaminants, such as dust, from the surface. In this washing, the back of the resin molded article 2, which is not to be coated, faces conveyor 6 and is not so cleaned.

Resin molded article is further moved to the right and forwarded to surface modifying apparatus 5, where spray of an aqueous ozone solution comes into contact with resin molded article 2. Through the contact, the surface of resin molded article 2 is oxidized by the oxidizing power of ozone remaining in water and is thereby polarized.

Resin molded article 2 having its surface thus modified is dried in drier 13 and subsequently forwarded to a coating step, where resin molded article 2 is coated with a polyester-based paint containing chlorinated polypropylene and dried to form coating layer 3.

Thus, the surface of resin molded article 2 is oxidized by the oxidizing power of ozone and is thereby polarized. Whatever shape resin molded article 2 may have (the article of this particular case is shaped into a bumper), the aqueous ozone solution surely reaches all over the surface of resin molded article 2 so that an oxidation reaction uniformly takes place on every part of the surface, hardly leaving marks due to reaction unevenness.

In this Example, the modified surface of resin molded article 2 is coated with a paint containing chlorinated polypropylene to form coating layer 3. Chlorinated polypropylene in the paint is capable of adhering to the modified surface by the mutual action between the chlorinated site thereof and the oxidized functional (polar) group on the surface of the resin molded article and is also capable of adhering even to unoxidized sites on the surface of resin molded article 2 by virtue of compatibility of the unchlorinated site thereof with the unoxidized sites. Accordingly, even if the treating time for surface modification is short and the surface modification attained is insufficient, coating layer 3 is adhered to the surface of resin molded article 2 with extremely high adhesion by the synergistic effect of adhesion of chlorinated polypropylene and bonding of polar groups of resin molded article 2 and the paint. As a result, extremely high adhesive strength to coating layer 3 can be obtained even if the surface modification is performed for a reduced treating time, which will lead to a reduction in overall cost relative to coating of a resin molded article.

Since the aqueous ozone solution is sprayed onto the surface of resin molded article 2, the amount of ozone applied to the surface of resin molded article 2 per unit time is relatively large. Therefore, the contact time is much shorter than required in the immersion system in which a resin molded article is immersed in an aqueous ozone solution. In other words, a short-time surface treatment will be enough for obtaining satisfactory adhesiveness to coating layer 3 and, as a result, the productivity is markedly improved.

Since the aqueous ozone solution is applied on the surface of resin molded article 2 by spraying, a diffusing boundary film of an aqueous ozone solution having a relatively small thickness is formed on the surface of resin molded article 2. The diffusing film is further stuck and compressed by the successive spray of an aqueous ozone solution and is thereby discontinuously disturbed. As a result, the oxidation reaction can be accelerated and the contact time of the aqueous ozone solution can therefore be reduced.

Unlike the immersion system, the contact between a sprayed aqueous ozone solution and resin molded article 2 can be made simply by spraying the former onto the latter while the latter being on a serial line of processing. That is, the resin molded article can be subjected to surface modification while on conveyor 6, while in the immersion system a resin molded article must be once removed from a conveyor after power washing and then immersed in a container. As a result, equipment for surface modification can be simplified, the space for the equipment can be reduced, and the cost for the equipment can be reduced.

Another difference of Example 3 and the conventional immersion system resides in that the aqueous ozone solution is heated by heater 9 immediately before it is sprayed on resin molded article 2, whereas in the immersion system the whole aqueous ozone solution in a container must be heated. Therefore, decomposition of ozone which may occur while the aqueous solution is maintained at a high temperature can be minimized and, as a result, the ozone concentration in the spray of the aqueous ozone solution can be kept high to improve efficiency of surface modification. Besides, it is only a portion of the aqueous ozone solution that has to be heated. Therefore, the energy for heating can be saved, leading to cost reduction.

Experiment A:

In order to verify the above-described actions and effects, a test piece was experimentally surface treated and coated with various paints as follows.

Preparation of Test Piece P:

A propylene homopolymer was molded into a test piece of 100 mm wide, 150 mm long, and 3 mm thick (hereinafter designated test piece P).

Test piece P was washed by striking a jet of water of 60° C. against the surface of test piece P at a water pressure of 100 kPa to remove dust.

Laboratory Device:

The same surface modifying apparatus as shown in FIG. 1-(b) was used. That is, the application means used is of the type in which an aqueous ozone solution is sprayed through spray nozzle 10 onto test piece P.

Members of the laboratory device other than the application means are shown in FIG. 7-(b). As shown in the Fig., oxygen cylinder 31 is connected to ozone generator 32, and generated ozone is fed to mixer 35 via valve 33 and back-flow trap 34. To mixer 35 is also fed an aqueous ozone solution (nearly water) by means of pump 36, where ozone gas is dissolved in water to form an aqueous ozone solution. The aqueous ozone solution is introduced into another mixer 37 together with part of the ozone gas, where dissolving is continued while heating the aqueous ozone solution to a prescribed temperature by heater 38 provided around mixer 37.

The aqueous ozone solution from mixer 37 is then introduced into gas trap 39 where excess ozone gas is trapped and forwarded, through valve 40 and condensed moisture trap 41, to activated carbon filter 42, where ozone gas is decomposed to oxygen gas, which is discharged to the open air through aspirator 43. On the other hand, the aqueous ozone solution from gas trap 39 is led to one of the above-mentioned application means and applied to test piece P on rack 44. The aqueous ozone solution having spread over test piece P is reserved in glass container 45 and led to pump 36 as mentioned above. In the experiment, the above-described flow of steps is repeated.

Experimental Procedure:

Surface modification of test piece P was carried out using the laboratory equipment described above under the following conditions.

The ozone concentration, hydrogen ion concentration (pH), temperature, and flow rate of the aqueous ozone solution immediately before entering the application means were 7 ppm, pH of about 3.7, 50° C., and 1.7 l/min, respectively. The treating time per sample was 100 seconds. A silent discharge type ozone generator OZSD-5A (manufactured by Ebara Jitsugyo K.K.) was used as ozone generator 32. The rate of ozone generation was 3 g/hr. The concentration of the aqueous ozone solution was measured with a commercially available measuring instrument Kentaro (manufactured by Ebara Jitsugyo K.K.).

After drying at 80° C. for 10 minutes, the thus obtained surface-treated test piece (Sample Nos. 4 to 5) was coated with a polyester-based paint, an acrylic paint or a polyester-based paint containing 7 wt % of chlorinated polypropylene. The coated paint was dried at 80° C. to form a coating layer. The peeling strength of the coating layer was measured with a tensile tester Tensilon at a peel angle of 180° and a pulling speed of 50 mm/sec.

For comparison, test piece P with its surface unmodified (Sample No. 1 to 3) was coated with each of the above-described paints, and the peeling strength of the coating layer was measured in the same manner as described above.

Results:

The peeling strength of the coating layer at the central portion in the width direction was measured. The results obtained are shown in Table 4.

TABLE 4

| Sample No. | Surface Modification | Paint | Peeling Strength (N/m) |
|---|---|---|---|
| 1 | undone | polyester-based paint | 50 |
| 2 | undone | acrylic paint | 50 |
| 3 | undone | CPP*-containing polyester-based paint | 600 |
| 4 | done | polyester-based paint | 400 |
| 5 | done | acrylic paint | 400 |
| 6 | done | CPP-containing polyester-based paint | 1000 |

Note:
*CPP stands for chlorinated polypropylene.

As is apparent from the results in Table 4, samples having been treated with an aqueous ozone solution exhibit increased peeling strength, and coating layers formed by using a paint containing chlorinated polypropylene exhibit increased peeling strength. It is thus understood that the surface modification with an aqueous ozone solution and the use of chlorinated polypropylene produce a synergistic effect in manifestation of high peeling strength.

Experiment B:

Test piece P was experimentally treated in the same manner as in Experiment A, except for varying the treating time, and the treated test piece P was coated with a polyester-based paint or a polyester-based paint containing chlorinated polypropylene in the same manner as in Experiment A. The change of peeling strength with treating time is shown in FIG. 13.

Figure 13:
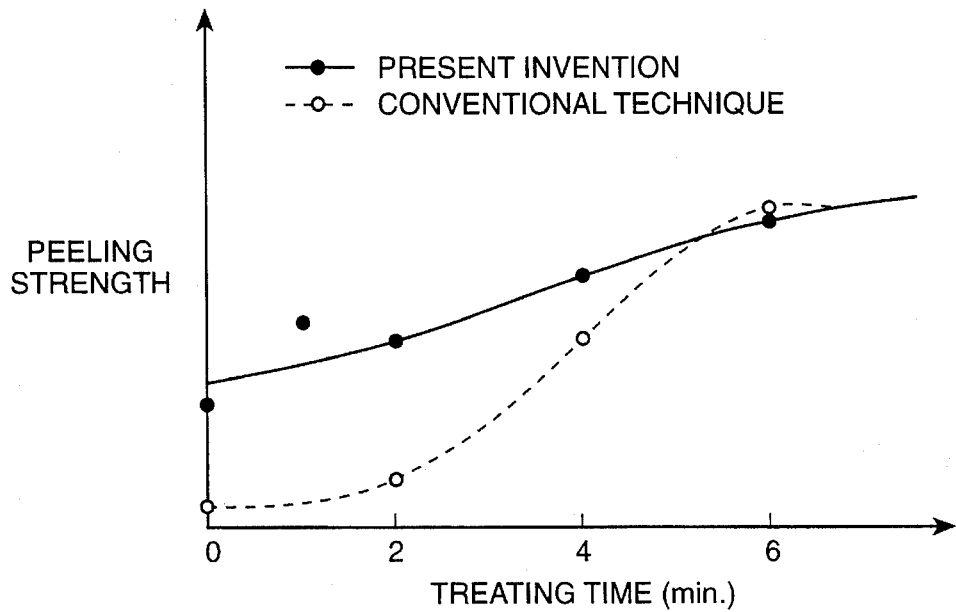
FIG. 13 is a graph showing the relationship of peeling strength vs. surface modification time as compared with a conventional technique.

As is apparent from FIG. 13, when compared with the sample coated with a conventional polyester-based paint, the sample coated with a polyester-based paint containing chlorinated polypropylene exhibits sufficient peeling strength even if the treating time for surface modification is short. In other words, the use of a coating composition containing chlorinated polyolefin makes it possible to greatly reduce the treating time with an aqueous ozone solution.

The present invention is not construed as being limited to Example 3 and may be carried out according to the following embodiments.

(1) While in Example 3 the aqueous ozone solution is applied in the form of spray to the face of resin molded article 2 (the side to be coated). If all the surfaces of resin molded article 2 are to be modified, the aqueous ozone solution may be sprayed from every necessary direction. Further, the aqueous ozone solution may be applied in the form of a stream (a waterfall).

(2) While in Example 3 resin molded article 2 was washed using power washer 4 before surface modification, such a washing step may be omitted.

(3) While in Example 3 a polypropylene resin molded article was used as a substrate of surface modification, the material of a resin molded article may be any other materials mainly comprising a polyolefin resin, such as polyethylene, and may contain other secondary components. Further, the shape of the molded article is not limited to a bumper shape as in Example 3, and the present invention may be applied to a resin molded article of any other shapes, such as various exterior trim parts, e.g., a grille, a garnish, a molding, a spoiler, a lamp, a mark, an emblem, a wheel cover, etc.

(4) While in Example 3 heater 9 or 38 was provided on the line at a position immediately before the stage of applying an aqueous ozone solution onto resin molded article 2, it may be fitted in a more upstream position. For example, the heater may be set in glass container 45 in some cases.

(5) While in Example 3 a polyester-based paint containing chlorinated polypropylene was used, a paint comprising chlorinated polypropylene-grafted polyester resin or a block copolymer of chlorinated polypropylene and a polyester may also be employed.

As having been fully described, according to the surface modification method and coating method of the present invention, the surface of a polyolefin resin molded article having relatively low surface polarity can be modified satisfactorily in a reduced treating time so as to exhibit high adhesion to a coating film formed thereon. Moreover, the surface modification can be carried out on a serial production line and at a reduced cost of energy.

While the invention has been described in detail and with reference to specific embodiments thereof, it will be apparent to one skilled in the art that various changes and modifications can be made therein without departing from the spirit and scope thereof.

What is claimed is:

1. A method for treating the surface of a polyolefin resin molded article which comprises applying a stream of running aqueous solution of ozone onto a polyolefin resin molded article to oxidize the surface of the polyolefin resin molded article for modifying the surface.

2. A method for treating the surface of a polyolefin resin molded article as claimed in claim 1, wherein said running aqueous ozone solution is running at a velocity of not lower than 0.3 m/sec.

3. A method for treating the surface of a polyolefin resin molded article as claimed in claim 1, which comprises further forming a coating layer directly on the surface-treated polyolefin resin molded article.

4. A method for treating the surface of a polyolefin resin molded article as claimed in claim 1, which comprises further forming a primer layer directly on the surface-treated polyolefin resin molded article, and then forming a coating layer on said primer layer.

5. A method for treating the surface of a polyolefin resin molded article as claimed in claim 3, wherein said coating layer comprises a coating composition containing chlorinated polypropylene.

6. A method for treating the surface of a polyolefin resin molded article which comprises spraying an aqueous solution of ozone onto a polyolefin resin molded article to oxidize the surface of the polyolefin resin molded article for modifying the surface.

7. A method for treating the surface of a polyolefin resin molded article as claimed in claim 6, wherein the spray pressure (A; kPa) of said aqueous ozone solution and the distance (B; cm) between the tip of the nozzle(s) for spraying said aqueous ozone solution and the surface of said polyolefin resin molded article satisfy the relationship: $A \cdot B^{-2} \geq 0.07$.

8. A method for treating the surface of a polyolefin resin molded article as claimed in claim 6, wherein said aqueous ozone solution has a temperature of from 65° to 85° C.

9. A method for treating the surface of a polyolefin resin molded article as claimed in claim 6, which comprises further forming a coating layer directly on the surface-treated polyolefin resin molded article.

10. A method for treating the surface of a polyolefin resin molded article as claimed in claim 6, which comprises further forming a primer layer directly on the surface-treated polyolefin resin molded article, and then forming a coating layer on said primer layer.

11. A method for treating the surface of a polyolefin resin molded article as claimed in claim 9, wherein said coating layer comprises a coating composition containing chlorinated polypropylene.

* * * * *